Patented Aug. 8, 1950

UNITED STATES PATENT OFFICE 2,517,585

N-(2-CYANOETHYL)-2-PYRROLIDONE-5-CARBOXYLIC ACID AND METHODS FOR ITS PREPARATION

Leonard L. McKinney, Eugene H. Uhing, and John C. Cowan, Peoria, Ill., assignors to the United States of America as represented by the Secretary of Agriculture No Drawing. Application November 22, 1949, Serial No. 128,904

4 Claims. (Cl. 260—313)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to a novel chemical compound N-(2-cyanoethyl)-2-pyrrolidone-5-carboxylic acid, which may also be designated N-(2-cyanoethyl)-glutiminic acid, or more conveniently cyanoethyl-glutiminic acid. This invention also relates to novel methods for its preparation. The compound has the following formula:

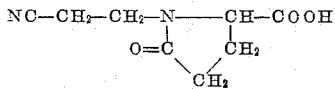

It is a white crystalline compound, soluble in water and organic solvents, and is useful as an intermediate in the preparation of synthetic resins, artificial fibers, plastics, plasticizers, pharmaceuticals and other products.

The compounds may be made by reactions which may be shown schematically as follows:

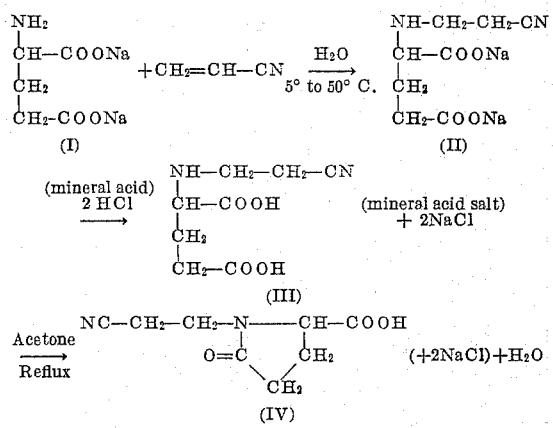

Monocyanoethyl-glutamic acid (compound III) is readily prepared by reacting an aqueous solution of a salt of glutamic acid, such as disodium glutamate with acrylonitrile in accordance with the process disclosed in our application Ser. No. 84,257, filed March 29, 1949, as exemplified below. This compound may then be converted into cyanoethyl-glutiminic acid, the conversion involving loss of water and closure of the pyrrolidone ring. The conversion takes place readily and may be carried out at room temperature or below. It may be effected practically quantitatively by heating. The dry compound III or its monohydrate may be heated directly, or it may be heated in a solvent medium, such as for example, acetone or water.

In the process as shown above, compounds II and III need not be isolated. The mineral acid salt admixed with compound III need not be separated, for when water is removed from the mixture and the residue is refluxed with acetone, compound IV is formed and goes into solution. The salt remains insoluble and may be removed by filtration. Compound IV may then be recovered in crystalline form by methods known to those skilled in the art.

The starting glutamic acid may be in any of its optically active forms or racemic mixture and, moreover, may be comprised in a crude mixture of alpha amino acids, such as is obtained from protein hydrolysates. Upon reacting such mixtures of amino acids with acrylonitrile, monocyanoethyl-glutamic acid may be readily converted to cyanoethyl-glutiminic acid whereupon it can be readily isolated from the reaction mixture because of its solubility characteristics.

The following examples are illustrative of the methods of carrying out the invention:

EXAMPLE 1

Two moles (294.26 g.) of l-glutamic acid was suspended in 250 ml. of water, and 200 ml. of water containing 4 moles (160.0 g.) of sodium hydroxide was slowly added while keeping the temperature below 30° C. Acronitrile (2.03 moles or 132.8 ml.) was added and the reaction allowed to proceed at room temperature, with occasional shaking, for 24 hours. Nitrogen analysis of an aliquot taken from the reaction mixture at this time indicated that one equivalent of acrylonitrile had reacted. The reaction mixture was then acidified with 4 moles (327.5 ml.) of concentrated hydrochloric acid whereupon crystals of mono-cyanoethyl glutamic acid monohydrate began to form. The water was removed by distillation at reduced pressure, leaving a sticky residue. Acetone (600 ml.) was added to the residue and the mixture heated under reflux for 30 minutes whereupon the cyanoethyl derivative went into solution. Sodium chloride was then filtered off, washed with a small amount of acetone, and the washings were added to the filtrate. Upon cooling to −30° C. with the aid of Dry Ice, 355 g. of crystals were obtained (yield of crude product 97 percent). Upon recrystallizing twice from hot acetone, pure N-(2-cyanoethyl)-1-glutiminic acid was obtained:

*Analysis*

|  | C | H | N |
|---|---|---|---|
| Calculated | 52.8 | 5.54 | 15.4 |
| Found | 52.9 | 5.53 | 15.4 |

Neutral equivalent: Calculated, 182.2; found, 183.
M. P.: 123.5°–124° C.
Solubility: In H$_2$O 49.6°, infinite hot. In abs. ethanol 29.7$^{25°}$; in acetone 20.3$^{25°}$.
[α]$_D^{23}$, 0.1 M in 0.4 N HCl = −7.3°.

EXAMPLE 2

Mono-cyanoethyl-glutamic acid monohydrate was prepared by reacting acrylonitrile with disodium glutamate followed by acidifying with two equivalents of hydrochloric acid as described in Example 1. The crystals of mono-cyanoethyl-glutamic acid were filtered off, washed free of chloride ions with cold water, and air dried. N Anal: Found 12.75; Calc'd. for the monohydrate 12.83. The water of crystallization could be removed from this compound by drying over phosphorous pentoxide and by drying in a vacuum oven for 3 hours at 100° C. This dried compound did not give a true melting point. It was heated at 130° C. for 1.5 hours, and N-(2-cyanoethyl)-glutiminic acid was formed thereby (M. P. 122°–124° C.). This product may be isolated by taking it up with acetone, since it is soluble in acetone, whereas N-(2-cyanoethyl)-glutamic acid is not.

We claim:

1. N-(2-cyanoethyl)-2-pyrrolidone-5-carboxylic acid of the following formula:

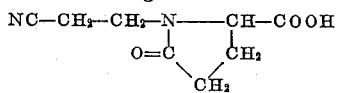

2. The process which comprises heating monocyanoethyl-glutamic acid to effect closure of the pyrrolidone ring and produce the compound of claim 1.

3. The process which comprises reacting a salt of glutamic acid with acrylonitrile and reacting the product with a mineral acid, heating the reaction product to form the compound of claim 1.

4. The process which comprises reacting the disodium salt of mono-cyanoethyl-glutamic acid with hydrochloric acid to form mono-cyanoethyl-glutamic acid monohydrate, removing water from the reaction mixture and heating the dried residue to form N-(2-cyanoethyl)-2-pyrrolidone-5-carboxylic acid and separating said N-(2-cyanoethyl)-2-pyrrolidone-5-carboxylic acid from the reaction mixture.

LEONARD L. McKINNEY.
EUGENE H. UHING.
JOHN C. COWAN.

No references cited.